United States Patent Office 3,625,718
Patented Dec. 7, 1971

3,625,718
NEW THERMALLY CRYSTALLIZABLE GLASSES AND LOW EXPANSION TRANSPARENT, TRANSLUCENT AND OPAQUE CERAMICS MADE THEREFROM
Richard W. Petticrew, Perrysburg, Ohio, assignor to Owens-Illinois, Inc.
No Drawing. Continuation of application Ser. No. 630,507, Apr. 13, 1967. This application Oct. 13, 1969, Ser. No. 866,168
Int. Cl. C04b 33/00
U.S. Cl. 106—39 DV                                    10 Claims

ABSTRACT OF THE DISCLOSURE

The present patent application discloses compositions of matter in the form of glasses composed mainly of silica and alumina and containing other essential ingredients. The glasses of the invention are quite refractory and thermal shock resistant, having annealing point temperatures of at least 1100° F. and coefficients of thermal expansion in the range 30 to $50 \times 10^{-7}$/° C. over the range zero to 300° C.; they also have liquidus temperatures of less than 2550° F. The refractory glasses can be formed in the usual ways by pressing, blowing, etc., to make a variety of useful articles such as tableware and ovenware. Other essential ingredients of the glasses include lithium oxide and zinc oxide; these ingredients provide the necessary viscosity reduction so that the said forming processes can be employed. After the desired glass articles are formed they can be used as such. However, another product disclosed in the application is the product of heat treatment of the glasses of the invention. The remaining two ingredients of the present compositions, zirconium dioxide and titanium dioxide, contribute to the reduction in viscosity of the glass melts. They are also important in aiding in formation of the products of heat treatment of the present glasses, which are low-expansion crystalline ceramics that contain a multiplicity of very fine crystals dispersed in a glassy matrix. The following specification describes in more detail (1) how to carry out the heat treatment, (2) the properties of the glasses and (3) the properties of the ceramics which are derived from the glasses.

---

This is a continuation of applicant's copending application Ser. No. 630,507, filed Apr. 13, 1967 and now abandoned.

In one aspect the present invention relates to new relatively low thermal expansion glasses. In another aspect the invention relates to new glass-ceramic compositions, including transparent, translucent and opaque glass-ceramics.

There are a variety of uses for glasses that can be formed into articles by the usual glass forming methods, which glasses have a relatively low coefficient of thermal expansion enabling them to be employed, for instance, for making ovenware for the home or enabling them to be sealed to metals and ceramics of similarly low expansion characteristics. There is also a growing demand for low expansion, crystallized glasses, otherwise generally known as glass-ceramics, which are made by the controlled heat treatment of suitable glasses to cause the in situ conversion of the glass to a multiplicity of fine crystals dispersed throughout the glassy matrix which remains after the in situ crystallization. There is a demand for such low expansion glass-ceramics in three general forms, namely, transparent, translucent and opaque. Highly transparent glass-ceramics are in demand, for instance, in the form of telescope mirror blanks and transparent windows for ovens in the home, as well as for home cooking ware. Translucent glass-ceramics are highly desired for cooking stove tops or covers for burners of both electric and gas home cooking stoves. Opaque low expansion glass-ceramics are in demand for the use as cooking vessels in the home for both the oven and for use on top of the gas or electric burner, for building materials such as wall panels, and for counter tops to give another instance.

The present invention provides glasses and transparent, translucent and opaque-glass-ceramics which have a variety of uses, specifically including all of the uses mentioned, respectively, in the foregoing paragraph.

The present invention provides highly desirable compositions since a given composition can be used to make the glass articles mentioned above, the transparent glass-ceramic articles, the translucent glass-ceramic articles and the opaque glass-ceramic articles, all from the same melting furnace, all at the same time or at different times. Thus, a large variety of product demands can be met from the output of a single furnace.

It is thus an object of the present invention to provide low-expansion, refractory glass compositions which are useful (1) for making articles which are heat and thermal shock resistant and (2) for making crystalline ceramics by in situ thermal crystallization where such crystalline glass-ceramics are transparent glass-ceramics, translucent glass-ceramics and completely opaque glass-ceramics.

It is another object of the invention to provide new ceramic compositions which are thermal in situ crystalline products of heat treatment of such glasses, said ceramics including transparent, translucent and opaque glass-ceramics having low average lineal coefficients of thermal expansion of less than $11 \times 10^{-7}$ per ° C., increase in temperature over the range zero to 300° C. and being highly thermal shock resistant.

It is a further object of the invention to provide glasses useful not only to make low expansion glass objects but also to make all three types of crystalline ceramics or glass-ceramics, i.e., transparent, translucent and opaque, each having an average lineal coefficient of thermal expansion per ° C. of less than $11 \times 10^{-7}$ over the range zero to 300° C.

Other objects, as well as aspects and advantages, of the invention will become apparent from this disclosure and the claims.

In accordance with the present invention, there are provided new glasses which have an average lineal coefficient of thermal expansion over the range zero to 300° C. between 30 and $50 \times 10^{-7}$/° C. of temperature increase, an annealing point temperature of at least 1100° F. and a composition containing as the sole essential ingredients, expressed in weight percent of the total glass composition, $SiO_2$ 64–74, $Al_2O_3$ 15 to 23, $Li_2O$ 3.3 to 4.8, ZnO 1 to 3.8, $TiO_2$ 1.2 to 2.4 and $ZrO_2$ 0 to 2, with the provisos that when $ZrO_2$ is over 1.7 $Li_2O$ is over 4, that the weight percent $TiO_2$ plus one half the weight percent $ZrO_2$ totals at least 2.2, that the weight percent $Li_2O$ plus the weight percent ZnO is greater than 4.7, that at least 90 weight percent of the composition consists of the foregoing ingredients, that said composition contains less than 2.5 weight percent MgO and less than 2.5 weight percent CaO if such ingredients are present at all, that the weight ratio of ZnO to MgO is at least 1, and that the ratio of ZnO to CaO is at least 1, said glass compositions having the property of being thermally crystallizable to yield transparent, translucent and opaque crystalline ceramics. My glasses have suitable liquidus temperatures, as stated, below 2550° F.

Alumina is limited to 23 weight percent because with values much over this is a high expansion material is formed, probably zinc aluminate, which increases the expansion of the product undesirably. MgO and its amount in relation to ZnO is limited because higher contents of MgO definitely increase the coefficient of thermal expansion and undesirably causes a high expansion phase to form in the grain boundaries between crystals.

Other compatible inorganic oxides and halides can be present in the glasses of the present invention without significantly changing the basic and novel characteristics of the present glasses (or of the glass-ceramics made therefrom). For instance, $P_2O_5$ is often employed in amounts up to 3 percent but higher amounts are undesirable, $Na_2O$ and $K_2O$ can be used judiciously in amounts up to 1.5 percent, but their aggregate total in the glass compositions should be kept below 2 weight percent. These ingredients unduly increase the coefficient of expansion, especially at high temperature ranges such as 500–800° C., and they tend to retard the desirable crystallization when the glasses are used to prepare the glass-ceramics of the present invention. CaO can be used in amounts less than 2.5 weight percent but its use tends to retard the crystallization and increase the coefficient of expansion of the glass and of the glass-ceramics. $B_2O_3$ is another permissible ingredient but care must be taken in employing this ingredient in amounts of more than 2 weight percent, especially since crystallization is retarded when using the glasses to make glass-ceramics. Small amounts of fluorine and chlorine (present, of course, as the fluoride or chloride) are permissible. Fluorine is often desirable in amounts up to 0.3 weight percent as it appears to increase the rate of crystallization. Chlorine is present mainly because of its use as a fining agent in the melting of the glass. It is seldom present in the products in amounts more than 0.2 weight percent.

I have found that the maximum weight percentage of zirconium dioxide must be limited in the present compositions in order to obtain compositions with an adequately low liquidus for commercial forming methods. While the maximum amount of zirconium dioxide can be up to about 2 weight percent when the weight percentage of lithium oxide is over 4, it should be limited to about 1.7 weight percent when the lithium oxide content is not over 4 weight percent. Otherwise, at some critical point in any given composition within the scope of my invention a small increase of even $\frac{1}{10}$ weight percent $ZrO_2$ will dramatically increase the liquidus temperature to an undesirably high level. Example 8 in Table I, shown hereinafter, illustrates a composition having an extremely high liquidus because of the presence of excessive zirconium dioxide. This can be compared with many compositions, including Example 7 which is almost identical except for zirconium content.

The objects of the invention are achieved to the greatest degree with the compositions as set forth hereinbefore, but modified so that the range of $SiO_2$ is from 66 to 73, the range of $Al_2O_3$ is from 15 to 22, the range of ZnO is from 1.3 to 3.8, the range for $TiO_2$ is from 1.2 to 2, the range for $ZrO_2$ is from 0.4 to 2 and the amount of magnesium oxide is restricted to amounts no more than 1.5 weight percent.

According to the present invention there are also provided glass-ceramics having a crystal size essentially below 25 microns across (as later defined) and an average lineal coefficient of thermal expansion per ° C. temperature increase of less than $11 \times 10^{-7}$ over the range from zero to 300° C.; these crystalline ceramics have the compositions of, and are made by thermal in situ crystallization of, the glasses of the invention hereinbefore described. They are provided, according to the invention, as transparent, translucent and opaque glass-ceramics.

Broadly, a suitable method of making the new glass-ceramics of the invention comprises forming a glass object or article from a glass of the invention set forth hereinbefore, and thereafter heat treating the glass, first, at a low temperature to form many nuclei or crystallites, and thereafter at a higher temperature to complete in situ crystallization to the desired degree and form (transparent, translucent, opaque). The optimum heat treatment schedule depends on, as will be understood, the particular glass composition, the ratio of its ingredients and the type and amount of its nucleants, as well as the final properties desired. Therefore, it is not possible to specify a heat treatment schedule that will be common to all of the glasses of the invention. However, it is usually preferred that the first-mentioned low temperature heat treatment be in the region of maximum or high rate of nuclei or crystallite formation, wherein "nuclei" are defined as submicroscopic precursors of crystalline species or as a finely dispersed submicroscopic immiscible glassy phase. It is difficult to measure directly the area or range of temperatures in which the maximum rate of nuclei formation occurs, or in other words where the optimum temperature for the initial heat treatment is to be located. However, this temperature usually lies in the range from the annealing point of the glass to 250° F. above the annealing point of the glass.

While this maximum rate of nuclei formation temperature range is difficult to measure directly, the optimum initial heat treatment temperature can be empirically determined employing small droplets of the glass and a micro-furnace capable of very rapid temperature change and accurate temperature control. A droplet of the glass that has been cooled to below the annealing point temperature, can be rapidly heated in the micro-furnace to a specific temperature between the annealing point and 250° F. above the annealing point, and held at such temperature for a specified time interval, the length of time of heating depending, again, upon the particular glass. Thus, if the glass inherently very rapidly forms nuclei, a shorter specified time at the low temperature can be used than if the nuclei are relatively only slowly formed. In any case, as an example, a droplet of the glass can be heated for 15 minutes at 40° F. above the annealing point temperature. Thereafter the droplet of glass in the micro-furnace is very rapidly heated to a predetermined crystallization temperature within the range, say, from 1800–1950° F. and held at such predetermined temperature for a specific length of time, for instance, one-half hour. This process can be repeated, using the same length of time of initial and final heating and the same temperature of final heating, but using different initial heating temperatures, say 30, 50, 60, 70 and 80° F. above the annealing point temperature. Thereafter by microscopic examination, one can determine which initial heat treatments resulted in formation of the most and finest crystals, and thus determine the range of temperatures where maximum number of crystallization centers are formed.

The process of making glass-ceramics of the invention thus usually comprises heat treating the formed article in an optimum initial temperature range between the annealing point and 250° F. above the annealing point for a time of at least 5 minutes, usually at least 15 minutes, and thereafter heat treating at a higher crystallization temperature. The time of initial heat treatment has no upper limit; usually it is not more than ten hours, but longer times can be used to obtain maximum nuclei for special purposes. The crystallization heat treatment stage is usually effected at higher temperatures in the range from about 1400–2300° F. with a sufficient length of time of heating in this range to effect in situ crystallization to the extent that the resulting glass-ceramic product has an average lineal coefficient of thermal expansion of less than $11 \times 10^{-7}$ per ° C. temperature increase over the range from zero to 300° C. The overall heat treatment chosen, that is, the initial or nucleation heat treatment and the crystallization heat treatment results in a multitude of very small, randomly oriented, substantially homogeneously dispersed crystals, essentially all of which crystals are in their largest lineal dimension less than 25 microns across, dispersed in a glassy matrix remaining as a result of the in situ crystallization.

The foregoing expansion and crystal size properties are properties of all crystalline ceramic products of this invention.

In one embodiment, when the ceramic body or shaped article will have as a main crystalline phase spodumene or spodumene-like crystalline phases as indicated by X-ray powder diffraction techniques, the crystallizing heat treatment includes the range of about 1800–2300° F. Again, it must be noted that the optimum time and temperature for the crystallizing heat treatment depends on the glass composition and its initial heat treatment. Time intervals in the range from 1400–2300° F. or in the range from 1800–2300° F. can vary widely, but the times are usually from about 15 minutes to about 3 or 4 hours, usually not over 8 hours, longer times usually being employed at lower temperatures and vice versa. As will be understood, when going from the initial heat treatment temperature to the higher crystallization temperature of about 1800–2300° F. it is usually preferred to proceed slowly enough so that appreciable crystallization takes place in the intermediate temperature range, at least to such a degree that a rigid crystalline network is formed that prevents the article from slumping, unless, of course, slumping is desired as a method of reforming or for sealing purposes. In this intermediate temperature range beta-eucryptite or beta-eucryptite-like crystalline forms usually appear, and thereafter are in some manner converted to beta-spodumene or beta-spodumene-like crystalline forms at the higher temperature range. Although the specific examples often show several plateaus of heat treatment temperatures, the entire heat treatment can be effected using slowly and continuously rising temperatures. When the highest temperature of the crystallization heat treatment step is limited to no more than about 1675° F., again for a sufficient period of time that the lineal coefficient of expansion of the ceramic product is less than $11 \times 10^{-7}$, a main crystalline phase formed is beta-eucryptite or a beta-eucryptite-like phase, as indicated by X-ray diffraction; since beta-eucryptite is a very low expansion phase, the resulting ceramics also often have expansion coefficients much below $11 \times 10^{-7}$ and very often zero or less, depending in part on the extent of the crystallization. As the temperature is increased over about 1650° F. in the crystallization heat treatment, one can obtain mixtures of beta-eucryptite-like crystals and beta-spodumene-like crystalline species.

It is a particularly advantageous feature of the glasses of the present invention that a given glass composition can be converted by heat treatment to a transparent ceramic, a translucent ceramic or an entirely opaque ceramic or kept in the glassy state as a useful glass article per se. It is not possible, of course, to specify a heat treatment schedule common to all of the glasses of the present invention for making any particular type of product, i.e., transparent, translucent or opaque. However, it is noted that transparent products are favored by relatively long nucleation temperature range heating times so that a very large number of nuclei are formed which subsequently promote the formation of more crystals which are consequently smaller crystals. Thus, most products of the present invention that are transparent have this property because the crystals are so small that they scarcely diffract visible light. It will be noted, however, that transparent products can be formed sometimes at relatively high temperatures, such as the 1800° F. of Example 1 and the 1900° F. of Example 6. The general principles to remember are (a) to promote the formation of the largest number of nuclei and (b) that increases in time and temperature independently favor the growth in size of crystals. Each of the glasses can be formed also into opaque glass-ceramics; the main controls employed to favor the formation of opaque glass-ceramics are heat treatment temperatures in the higher part of the range and increasing times of heat treatment. For a given glass, it will be understood, time and temperature conditions intermediate those which produce opaque and those which result in transparent glass-ceramics will result in translucent glass-ceramics. Obviously some purely routine experimentation may be necessary in a given instance.

While heat treatments with holding times at two or more temperature levels have thus far been described, it is also possible to carry out the entire crystallization heat treatment at a single temperature. This temperature is in the range of temperatures at which a high rate of nuclei formation occurs; however, if sufficient time is given crystals will in fact grow in such nuclei formation temperature range. For instance see the four hour heat treatment at 1360° in Example 2 and the similar heat treatment in Example 14. Both of the resulting transparent crystallized products are highly crystallized as indicated by their coefficents of thermal expanson.

The foregoing discussion and instructions for heat treatments are merely exemplary and are not intended to be limiting. Likewise, the heat treatments given hereafter in connection with specific working examples are merely exemplary. Many other heat treatment schedules are possible. For instance, a glass of composition 1 listed in Table I could be heat treated at a single temperature in the range from about 1350 to about 1450 for a time somewhere in the range of about 100 to about 400 hours to obtain a low expansion, transparent glass-ceramic having a negative coefficient of expansion over the range zero to 300° C. and containing as a main crystalline phase beta-eucryptite or a beta-eucryptite-like crystalline phase. On the other hand, the first heat treatment given in Table II for this same glass could be altered by changing the 1800° heat treatment step from 1½ hours to say, 15 to 50 hours, to thus obtain a translucent or possibly an opaque glass-ceramic, in either case containing as a main crystalline phase beta-spodumene or a beta-spodumene-like crystalline phase. It is noted that all of the glass-ceramic products of the present invention, including the specific examples discussed and shown in the tables, contain as predominant crystalline species, lithium-containing crystalline phases, either as beta-eucryptite or beta-eucryptite-like crystals or as beta-spodumene or beta-spodumene-like crystals, or both, i.e., these lithium-containing crystalline phases in the aggregate are present in the glass-ceramics in greater amount by volume than any other crystalline material which is present in the claimed ceramic products. In most instances one or the other of such crystalline species is present in obviously larger amounts than the other. Thus, the main crystalline phase in the transparent product of Example 1, whose heat treatment and properties are summarized in Table II, contain as the main crystalline phase beta-spodumene or a beta-spodumene-like crystalline phase, as do all of the examples of heat treatments of the Example 1 glass shown in Table II. On the other hand, the transparent products of Examples 2, 3, 4, 5, 9, 11 and 14 contain beta-eucryptite or a beta-eucryptite-like crystalline phase as the main crystalline phase present, while all of the opaque products illustrated in Table II contain beta-spodumene or a beta-spodumene-like crystalline phase as the main crystalline phase.

The glasses of the invention can be made from usual batch materials such as silica sand, petalite, alumina, titania, zircon, titanium dioxide, lithium fluoride, sodium chloride, aluminum metaphosphate, usual fining agents such as antimony oxide or arsenic oxide, etc. In the case of the zirconia ingredient, it is possible to use a fused frit containing silica, lithia, zirconia and zinc oxide in order to introduce the zirconia into the furnace in a form more easily meltable. The glasses of the invention can be melted in the normal manner in gas-fired furnaces preferably using slightly oxidizing conditions. Electric boosting can be provided where desired. In the laboratory platinum crucibles can be used, care being taken not to employ over two or three tenths of a percent of $As_2O_3$ as a refining agent if this refining agent is employed, or the platinum will be attacked. In larger furnaces high quality refractories are employed, such as high-alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition may thus be necessary to compensate for the alumina from the refractory.

In a typical example of preparation of a glass of the invention, as well as of ceramics of the invention made therefrom, the following batch materials were melted at a glass temperature of 2900 to 2950° F. for about 21 hours in a platinum lined pot furnace, using a slight excess of air for an oxidizing atmosphere. The batch is shown below in parts by weight:

| | Parts by weight |
|---|---|
| Petalite [1] | 1477.8 |
| Flint [2] | 1774.7 |
| Alcoa A-10 alumina [3] | 764.4 |
| Soda ash [4] | 29.8 |
| Frit A [5] | 273.6 |
| Titanox [6] | 90.5 |
| Frit B [7] | 674.7 |
| Lithium fluoride [8] | 20.5 |

Analyses in footnotes below are in weight percent.

[1] 4.29% $Li_2O$, 16.15% $Al_2O_3$, 77.1% $SiO_2$, 0.49% $Na_2O$, 0.31% $K_2O$ and 0.026% $Fe_2O_3$, and other minor impurities, including 1% ignition loss.
[2] 99.96% $SiO_2$.
[3] 99.4% $Al_2O_3$, 0.04% $Fe_2O_3$, 0.13% $Na_2O$, 0.13% $SiO_2$, 0.3% ignition loss.
[4] 58% $Na_2O$.
[5] A fused mixture of 65.8% $SiO_2$, 11.48% $Li_2O$, 9.98% $ZrO_2$ and 12.78% $ZnO$.
[6] Substantially pure $TiO_2$.
[7] A fused mixture of 65.71% $SiO_2$, 11.32% $Li_2O$, 6.7% $ZrO_2$ and 16.32% $ZnO$.
[8] Essentially pure LiF.

The resulting glass, had the following composition in parts by weight, to the nearest decimal point: $SiO_2$ 70.6, $Al_2O_3$ 19.8, $Li_2O$ 3.7, $ZrO_2$ 1.5, $TiO_2$ 1.9, $Na_2O$ 0.5, fluorine 0.1, and $K_2O$ 0.1. This was an excellent glass, and articles could be formed by pressing, blowing and drawing. The composition of the glass is repeated in the first column of Table I, along with its annealing temperature, average lineal coefficient of thermal expansion over the range zero to 300° C., liquidus temperature and the temperature at which the logarithm of the viscosity in poises is 4. In Table II will be seen the properties of several crystallized products, or glass-ceramics, made from this glass. It will be noted that different samples of the glasses were heat treated to obtain a transparent glass-ceramic, a translucent glass-ceramic, and an entirely opaque (white) glass-ceramic having, respectively, coefficients of thermal expansion of −0.2, +0.6 and +0.3×$10^{-7}$ over the range zero to 300° C. Note that the thermal expansion is essentially the same over a wide range of final heat temperatures which result in transparent, opaque or the intermediate translucent state and that all of the glass-ceramics have excellent thermal shock resistance and excellent flexural strengths.

Tables I and II summarize the properties of a number of representative examples of glasses and of glass-ceramics of the invention, each having the compositions in parts by weight set forth in Table I. Heat treatment schedules are also shown in Table II.

TABLE I.—COMPOSITION

| | 1 | 2 | 3 | 4 | 5 | 6 | 7 | 8* | 9 | 10 | 11 | 12 | 13 | 14 | 15 | 16 | 17 | 18 |
|---|---|---|---|---|---|---|---|---|---|---|---|---|---|---|---|---|---|---|
| Parts by weight: | | | | | | | | | | | | | | | | | | |
| $SiO_2$ | 70.6 | 70.2 | 69.2 | 69.4 | 68.5 | 69 | 68.2 | 67.3 | 69.5 | 68.8 | 68.8 | 69 | 70.3 | 70.2 | 67.9 | 68.9 | 72 | 70.8 |
| $Al_2O_3$ | 19.8 | 17 | 17 | 16.9 | 19.1 | 19.6 | 19.4 | 19.1 | 16.9 | 18.9 | 17.9 | 21 | 19.1 | 17.1 | 19.4 | 19.4 | 18.5 | 17.6 |
| $Li_2O$ | 3.7 | 3.9 | 3.5 | 3.5 | 3.5 | 3.8 | 3.8 | 3.8 | 4 | 4.6 | 3.8 | 3.9 | 4.2 | 3.5 | 3.5 | 3.9 | 3.9 | 4.4 |
| $ZnO$ | 1.7 | 3.5 | 2.2 | 2.2 | 3.1 | 1.6 | 1.6 | 1.6 | 2.6 | 1.9 | 2.6 | 1.6 | 1.8 | 2.7 | 3.3 | 1.6 | 1.8 | 2.6 |
| $TiO_2$ | 1.9 | 1.8 | 1.8 | 1.8 | 1.8 | 1.8 | 1.8 | 1.8 | 1.8 | 1.7 | 1.8 | 1.8 | 1.8 | 1.8 | 1.9 | 1.9 | 1.8 | 1.8 |
| $ZrO_2$ | 1.5 | 1.4 | 1.4 | 1.4 | 1.4 | 1.4 | 1.4 | 2.5 | 1.4 | 1.4 | 1.4 | 1.5 | 1.6 | 1.4 | 1.3 | 1.4 | 1.5 | 1.8 |
| $P_2O_5$ | | 1.5 | 1.4 | 1.5 | 1.5 | 1.5 | 2.7 | 2.7 | 1.5 | 1.8 | 1.5 | | | 1.5 | 1.4 | 1.4 | | |
| MgO | | | 2.2 | 2 | | | | | | 1 | | | | | | | | |
| $Na_2O$ | 0.5 | 0.4 | 0.5 | 0.5 | 0.4 | 0.6 | 0.4 | 0.5 | 0.5 | 0.4 | 0.5 | 0.7 | 0.7 | 0.6 | 0.5 | 0.6 | 0.5 | 0.5 |
| $K_2O$ | 0.1 | 0.2 | 0.2 | 0.2 | 0.2 | 0.3 | 0.2 | 0.2 | 0.2 | 0.3 | 0.2 | 0.2 | 0.2 | 0.2 | 0.2 | 0.2 | | 0.3 |
| $Sb_2O_3$ | | 0.5 | 0.5 | 0.5 | 0.5 | 0.4 | 0.4 | 0.5 | 0.5 | | 0.2 | 0.5 | 0.3 | 0.3 | 0.4 | 0.4 | 0.4 | |
| F | 0.1 | 0.1 | 0.2 | 0.1 | 0.1 | | | | | | | | | 0.1 | 0.1 | 0.1 | | |
| Cl | | | | | | | | | | | | | | | 0.1 | 0.1 | | |
| CaO | | | | | | | | | | | | | | 1 | | | | |
| Glass properties: | | | | | | | | | | | | | | | | | | |
| AP | 1,260 | 1,150 | 1,245 | 1,240 | 1,225 | 1,225 | 1,250 | 1,400 | 1,200 | 1,200 | 1,240 | 1,300 | 1,270 | 1,225 | 1,160 | 1,245 | 1,290 | 1,240 |
| $\alpha \times 10^7$ (0-300° C.) | 34 | 40 | 43 | 36 | 37 | 40 | 39 | | 43 | 44 | | | 43 | 42 | 38 | 39 | 39 | 45 |
| Liq. | 2,460 | 2,460 | 2,430 | 2,440 | 2,440 | 2,410 | 2,420 | >2,650 | 2,430 | 2,440 | 2,425 | 2,470 | 2,435 | 2,445 | 2,400 | 2,405 | 2,440 | 2,450 |
| $Lg\eta=4$ | 2,480 | 2,470 | 2,400 | 2,440 | 2,450 | 2,500 | 2,505 | 2,480 | 2,400 | 2,400 | 2,450 | 2,470 | 2,495 | 2,425 | 2,430 | 2,480 [1] | 2,500 | 2,460 |

[1] Approximate.
*Example is outside the invention. $ZrO_2$ is too high.
Explanation of symbols in Table I: AP=annealing point temperature; Liq.=liquidus of the glass composition; $Lg\eta=4$, temperature at which the logarithm of the glass viscosity in poises is 4; $\alpha$ is coefficient of thermal expansion.

TABLE II.—HEAT TREATMENT AND GLASS-CERAMIC PROPERTIES

| | ° F. (hrs.) | TE | TS | MR |
|---|---|---|---|---|
| 1T | 1,300(2); 1,800(1.5) | −0.2 | >1,500 | 20.4 |
| 1L | 1,350(2); 1,950(1.25) | +0.6 | >1,600 | 19.7 |
| 1P | 1,350(2); 2,175(1) | +0.3 | >1,800 | 38.3 |
| 2T | 1,360(4) | −6.8 | | |
| 2L | 1,320(4); 1,450(2) | −2.9 | | |
| 2P | 1,300(2); 1,450(1); 1,500(1); 1,950(1) | +4.5 | >1,600 | 30.8 |
| 3T | 1,300(4); 1,450(2) | −1.1 | | |
| 3P | 1,300(2); 1,450(1); 1,500(1); 2,000(1) | 10 | >1,400 | 34.9 |
| 4T | 1,320(4); 1,450(2) | −0.5 | | |
| 4P | 1,350(1); 1,450(1); 1,950(1) | | >1,300 | 20.3 |
| 5T | 1,300(4); 1,450(1) | −5 | | |
| 5L | 1,300(2); 1,450(1); 1,850(1) | | >1,500 | 21.1 |
| 5P | 1,300(2); 1,450(1); 2,000(1) | 0.9 | >1,600 | 26.7 |
| 6T | 1,300(2); 1,450(1); 1,900(1) | | >1,500 | 15.5 |
| 6L | 1,400(2); 2,000(1) | +1.1 | >1,500 | 15.4 |
| 6P | 1,350(2); 1,500(1); 2,000(94) | +4.2 | >1,500 | 27 |
| 6P | 1,400(4); 2,050(1) | +2.1 | >1,500 | 17.5 |
| 7L | 1,350(2); 1,925(1) | 3.7 | >1,500 | 15.7 |
| 9T | 1,360(2); 1,400(1) | −5.5 | | |
| 9P | 1,300(1); 1,425(1); 1,950(1) | +7.2 | >1,400 | 23.1 |
| 10L | 1,300(2); 1,550(1) | +0.4 | | |
| 10P | 1,300(4); 1,925(1) | +1.3 | >1,600 | 30.6 |
| 10P | 1,400(2); 1,925(1) | | >1,600 | 35.4 |
| 11T | (1) Heated to 400; (2) heated at 400°/HR to 1,150; (3) Held 1,150-½ hr; (4) Heated to 1,250 at 200°/HR; (5) Heated to 1,320 at 75°/HR; (6) Held at 1,320 four hours; (7) Heated to 1,450 at 75°/HR; (8) Held at 1,450 two hours; (9) Cooled at 400°/HR rate | −9 | | 7.5 |
| 11L | 1,400(1); 1,500(1); 1,800(1) | 1.2 | | 17.1 |
| 11P | 1,350(1); 1,450(1); 1,950(1) | | >1,500 | 20 |
| 12T | 1,350(2); 1,600(1) | −11.4 | | |
| 12L | 1,350(2); 1,600(1); 1,950(1) | [1]+3.7 | >1,600 | |
| 12P | 1,350(2); 1,600(1); 2,100(1) | +8 | >1,700 | |
| 13T | 1,350(2); 1,600(1) | −13 | | |
| 13L | 1,350(2); 1,600(1); 1,900(1) | [2]+0.6 | | |
| 13P | 1,350(2); 1,600(1); 2,000(1) | +0.4 | | |
| 14T | 1,400(4) | +0.1 | | |
| 14P | 1,300(2); 1,450(1); 1,500(1); 2,000(1) | +7.5 | >1,400 | 30.5 |

See footnotes at end of table.

TABLE II.—Continued

| °F. (hrs.) | TE | TS | MR |
|---|---|---|---|
| 15L...... 1,350(2); 1,500(1); 1,850(1)............... | −2 | >1,800 | 19.3 |
| 16T...... 1,300(2); 1,450(1); 1,700(1)............... | −5.2 | >1,500 | 21.6 |
| 16L...... 1,350(2); 1,500(1); 1,800(1)............... | −2 | >1,600 | 20.5 |
| 17L...... 1,350(2); 1,600(1); 1,900(1)............... | [3]−1.7 | | |
| 18L...... 1,350(5); 1,600(1)....................... | −0.4 | | |
| 18P...... 1,350(2); 1,600(1); 2,200(1)............... | +0.3 | | |

[1] TE (0-750° C.) is 8.
[2] +6 from 0-800° C.
[3] +3.2 from 0-800° C.

Explanation of symbols in Table II: T=transparent; L=translucent; P=Opaque; MR=modulus of rupture in thousands of pounds per square inch; TS=thermal shock, ΔT in °F without failing; TE=average coefficient of lineal thermal expansion×10⁷ over the range zero to 300° C.

The glass and glass-ceramic compositions set forth in Table I have, with the exception of composition No. 8, the properties set forth hereinbefore, including the hereinbefore defined limitations with respect to annealing point, liquidus, coefficients of thermal expansion and capability of being crystallized in situ by thermal treatment to transparent, translucent and opaque glass-ceramics having a coefficient of thermal expansion of less than $11 \times 10^{-7}$ per ° C. and a crystal size less than 25 microns across as defined hereinbefore.

The excellent forming properties of the examples of the invention in Table I will be noted. A good relationship between the liquidus temperature and one of the most widely used working temperatures, the temperature at which the logarithm of the viscosity in poises is 4, will be noted. Ovenware and other glass objects requiring resistance to temperature make use of the excellent combination of high annealing point temperatures and low coefficients of expansion. The really exceptional properties of the glass-ceramics, as shown in Table II will be noted. Although on account of the limitations of time, not all of the examples are illustrated as having been made in transparent, translucent and opaque forms, they all could have been. In any event the excellent properties of all of the examples will be noted. Note the very low expansions which, especially when coupled with the high strengths or modulus of rupture give unusually high thermal shock resistance. It should be again emphasized that the glasses of the invention are quite unique in being excellent glasses having excellent working properties and also giving exceptional glass-ceramics in transparent, translucent or opaque forms. Example 8, not an example of the invention, illustrates the sensitivity of the general compositional area of the invention to the amount of zirconium dioxide. While the actual liquidus temperature was not determined, it was in fact determined to be higher than 2650° F., a completely impractical liquidus temperature for commercial forming methods.

As used in the claims appended hereto, the annealing point temperature can be determined by ASTM Designation C 336–54 T, with the testing apparatus being calibrated using fibers of standard glasses having known annealing and strain points as specified and published by the National Bureau of Standards.

Although the annealing point temperature in this application means the temperature determined by the ASTM method previously referred to, or an equivalent method, the annealing point temperatures given in the tables in most cases were not determined by the ASTM method and are not precise. It is believed, however, that most of the determined temperatures are within 15 or 20° of the true annealing point temperature, and in most cases the error is less. The liquidus temperature referred to in this specification has the usual meaning, that is, the maximum temperature at which equilibrium exists between the molten glass and its primary crystalline phase. The liquidus temperatures shown in Table I were quite carefully determined by a fairly precise method employing special platinum boats in a gradient furnace. However, such liquidus temperatures may also in some cases not be precise since they were not determined by the vary precise quenching and melting methods employed for the most careful phase diagram work and may be in error by as much as 15–20° F.

The log 4 viscosity temperatures in Table I are also not absolutely precise because they are estimated or extrapolated values from viscosities measured at higher temperatures, since it was too time consuming to make repeated measurements at repeated adjustments of temperatures of the glass until one was measuring precisely the temperature at which the logarithm of the viscosity was 4. Methods for determining viscosity are quite well known, and the preferred method involves two concentric cylinders separated by glass and the measurement of the rate of rotation of one cylinder under a given torque. For the general method, see Journal of the American Ceramic Society, vol. 12, No. 8, August 1929, pp. 505–529.

For determining the thermal shock resistance of the ceramics of the invention, cane or rods of the ceramic were plunged into water directly from an oven maintained 80° F. above the temperature shown in the Table I. The water was at 80° F. or lower. A value of 1300° F., for instance in Table I means that the rod did not crack or craze even slightly at the temperature differential indicated, but that it did crack when tested at the next hundred degree interval higher. Slight hairline cracks or crazing were detected by immersing the thermally shocked samples in a dye solution.

The tested flexural strength of the crystallized material was determined using crystallized cane samples, usually of about 0.20 inch in diameter, and in all cases from 0.15 to 0.5 inch in diameter. The modulus of rupture tests were made using a Tinius-Olsen testing machine. This machine applies a measured load through a single knife edge to the center of a 4" long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dial micrometer calibrated inches and equipped with a bar contact instead of a point contact is used to measure maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{Load (lbs.)} \times 8 \times \text{span (in.)}}{(D_1^2 \times D_2)\pi}$$

I arbitrarily define my transparent glass-ceramics as those products having substantially all of their crystals of a size less than about one third micron in diameter, and preferably less than one fourth micron. It will be appreciated that the definition is arbitrary and that the largest crystal sizes include some compositions obviously not wholly transparent, that the diffraction of light and cloudiness in some such compositions are apparent to the naked eye. Transparent glass-ceramics having excellent transparency characteristics for visible light made according to the present invention have substantially all crystals of less than 0.1 micron diameter. The term "diameter" as used herein refers to the largest lineal dimension across a crystal. It will be appreciated that I am disclosing that my present glasses can be employed to produce by thermal in situ crystallization transparent glass-ceramics as just defined, as well as translucent glass-ceramics and opaque glass ceramics, the translucent glass-ceramics being intermediate in their light diffracting properties between completely opaque glass-ceramics and the transparent glass-ceramics as previously defined.

The converted or heat treated products of the invention are called "glass-ceramics," "crystalline," "ceramics," or "crystalline ceramics" and they are, in fact, at least partially crystalline. There is, however, no intent to imply that the crystalline ceramic products of the invention contain more crystalline material than glassy material, either by volume or by weight. It now appears that in the present compositions it would be extremely difficult to show the percentage of crystalline material, or to show whether or not the "glassy" material predominates over the "crystalline" material, in any crystallized composition actually containing even approximately equal amounts of crystalline and glassy phases.

It should be noted that the present crystalline ceramic products of the invention cannot properly be claimed in pure product-by-characteristics language. A reference must be made in product claims to the fact that the crystalline material is formed by thermal or in situ crystallization from a previously made glass body or article. The in situ crystallization probably results in a continuously changing residual glassy phase composition and probably in many crystalline species of slightly different compositions. Moreover, it is probable that none of the crystalline ceramic products of the invention are formed under equilibrium conditions. Also, the crystalline phases are present in such small crystal sizes and abundant quantity that any attempt to study the specific chemical and physical structure in order properly to define my unique crystalline ceramic products, without a reference to the in situ method of their formation, is impossible.

In this specification the terms beta-eucryptite crystals and beta-eucryptite-like crystals have been used in an alternative sense. Thus, while beta-eucryptite is often thought of as the species crystal having one mole of lithia, one mole of alumina and 2 moles of silica, both terms are used in this application to designate crystalline species having the beta-eucryptite structure, as shown by X-ray diffraction, but the peaks can be shifted slightly depending upon whether there is a definite amount of silica present other than exactly 2 moles, either more or less silica than the 2 moles. Similarly, the terms beta-spodumene crystals and beta-spodumene-like crystals are used alternatively and in a generic sense, specifying crystalline species that have the crystalline structure of beta-spodumene that contains 4 moles of silica to one of alumina and one of lithia, but with the peaks shifted somewhat when the crystalline structure contains more or less than 4 moles of silica. Therefore, the terms beta-eucryptite and beta-spodumene are each used herein in this generic sense.

As will be evident to those skilled in the art, modifications of this invention can be made or followed in the light of the foregoing disclosure without departing from the spirit and scope of the disclosure.

I claim:

1. A glass which has
an average lineal coefficient of thermal expansion over the range of zero to 300° C. between 30 and $50 \times 10^{-7}/°$ C.,
an annealing point temperature of at least 1100° F.,
a liquidus temperature of less than 2550° F., and
a composition consisting essentially of, expressed in weight percent of the total glass composition, $SiO_2$ 64 to 74; $Al_2O_3$ 15 to 23; $Li_2O$ 3.3 to 4.8; ZnO 1 to 3.8; $TiO_2$ 1.2 to 2.4; and $ZrO_2$ 0 to 2; as the sole essential constituents, with the provisos that when $ZrO_2$ is over 1.7, $Li_2O$ is over 4; that the weight percent $TiO_2$ plus one half the weight percent $ZrO_2$ totals at least 2.2; that the weight percent $Li_2O$ plus the weight percent ZnO is greater than 4.7; that at least 90 weight percent of the composition consists of the foregoing ingredients, that said composition contains less than 2.5 weight percent MgO and less than 2.5 weight percent CaO if such ingredients are present at all; that the weight ratio of ZnO to MgO is at least 1, and that the weight ratio of ZnO to CaO is at least 1,
each such glass composition being further characterized as being thermally crystallizable by in situ crystallization to form a transparent ceramic and a translucent ceramic and an opaque crystalline ceramic, all from the same specific glass composition, each ceramic having an average lineal coefficient of thermal expansion less than $11 \times 10^{-7}$ per degree C. over the range of zero to 300° C. and having essentially all crystals of less than 25 microns across in their largest lineal dimension.

2. A low expansion crystalline ceramic which is (1) a product of thermal in situ crystallization of a glass of claim 1, (2) contains dispersed in a glassy matrix a multitude of crystals essentially all of which are less than 25 microns across and (3) has an average lineal coefficient of thermal expansion of less than 11 over the range zero to 300° C.

3. A ceramic of claim 2 which is transparent.
4. A ceramic of claim 2 which is translucent.
5. A ceramic of claim 2 which is opaque.
6. A glass which has
an average lineal coefficient of thermal expansion between 30 and $50 \times 10^{-7}/°$ C. over the range of zero to 300° C.,
an annealing point temperature of at least 1100° F.,
a liquidus temperature of less than 2550° F.,
a composition consisting essentially of, expressed in weight percent of the total glass composition, $SiO_2$ 66 to 73; $Al_2O_3$ 15 to 22; $Li_2O$ 3.3 to 4.8; ZnO 1.3 to 3.8; $TiO_2$ 1.2 to 2; and $ZrO_2$ is 0.4 to 2; as the sole essential constituents, with the provisos that when $ZrO_2$ is over 1.7, $Li_2O$ is over 4; that the weight percent $TiO_2$ plus one half the weight percent $ZrO_2$ totals at least 2.2; that the weight percent $Li_2O$ plus the weight percent ZnO is greater than 4.7; that at least 90 weight percent of the composition consists of the foregoing ingredients; that said composition contains no more than 1.5 weight percent MgO and less than 2.5 weight percent CaO if such ingredients are present at all; that the weight ratio of ZnO to MgO is at least 1; and that the ratio of ZnO to CaO is at least 1,
each such glass composition being further characterized as being thermally crystallizable by in situ crystallization to form a transparent ceramic and a translucent ceramic and an opaque crystalline ceramic, all from the same specific glass composition, each ceramic having an average lineal coefficient of thermal expansion less than $11 \times 10^{-7}$ per degree C. over the range of zero to 300° C. and having essentially all crystals of less than 25 microns across in their largest lineal dimension.

7. A low expansion crystalline ceramic which is (1) a product of thermal in situ crystallization of a glass of claim 6, (2) contains dispersed in a glassy matrix a multitude of crystals essentially all of which are less than 25 microns across and (3) has an average lineal coefficient of thermal expansion of less than 11 over the range zero to 300° C.

8. A ceramic of claim 7 which is transparent.
9. A ceramic of claim 7 which is translucent.
10. A ceramic of claim 7 which is opaque.

References Cited

UNITED STATES PATENTS

| | | | |
|---|---|---|---|
| 3,157,522 | 11/1964 | Stookey | 106—39 DV |
| 3,241,985 | 3/1966 | Kuwayama | 106—39 DV |
| 3,252,811 | 5/1966 | Beall | 106—39 DV |
| 3,282,712 | 11/1966 | Tashiro et al. | 106—39 DV |
| 3,380,818 | 4/1968 | Smith | 106—39 DV |
| 3,499,773 | 3/1970 | Petticrew et al. | 106—39 DV |

FOREIGN PATENTS

| | | | |
|---|---|---|---|
| 1,300,614 | 6/1962 | France | 106—39 DV |

TOBIAS E. LEVOW, Primary Examiner

W. R. SATTERFIELD, Assistant Examiner

U.S. Cl. X.R.

65—33; 106—52

PO-1050
(5/69)

UNITED STATES PATENT OFFICE
CERTIFICATE OF CORRECTION

Patent No. 3,625,718            Dated December 7, 1971

Inventor(s) Richard W. Petticrew

It is certified that error appears in the above-identified patent and that said Letters Patent are hereby corrected as shown below:

In Table I, column 7 "$ZnO_2$" should be --$ZrO_2$--;

In Table II, column 8, 6th line "<1,600" should be -- <1,700--;

Signed and sealed this 30th day of May 1972.

(SEAL)
Attest:

EDWARD M. FLETCHER, JR.            ROBERT GOTTSCHALK
Attesting Officer                 Commissioner of Patents